United States Patent [19]
Trapet

[11] Patent Number: 6,023,850
[45] Date of Patent: Feb. 15, 2000

[54] BALL CUBE

[76] Inventor: Eugen Herbert Trapet, Berliner Str. 12, Bortfeld, Germany

[21] Appl. No.: 08/956,096

[22] Filed: Oct. 24, 1997

[30] Foreign Application Priority Data

Oct. 28, 1996 [DE] Germany .......................... 196 44 712

[51] Int. Cl.[7] .................................................... G01B 3/00
[52] U.S. Cl. ................................................................ 33/502
[58] Field of Search ............................ 33/502, 503, 562, 33/567, 567.1; 73/1.79

[56] References Cited

U.S. PATENT DOCUMENTS

| | | | |
|---|---|---|---|
| 4,819,339 | 4/1989 | Kunzmann et al. | 33/503 |
| 4,932,136 | 6/1990 | Schmitz et al. | 33/502 |
| 4,962,591 | 10/1990 | Zeller et al. | 33/502 |
| 5,269,067 | 12/1993 | Waeldele et al. | 73/1.79 |
| 5,313,410 | 5/1994 | Watts | 33/503 |
| 5,813,128 | 9/1998 | Bailey | 33/502 |

*Primary Examiner*—G. Bradley Bennett

[57] ABSTRACT

An apparatus for the checking of coordinate measuring machines and machine tools is described. The apparatus is a low cost and low weight ball cube with balls that can be probed with three probe styli each (with probing points distributed over more than a hemisphere in each case), the probe styli directed normal to five different cube sides. These properties are obtained by giving the balls an offset from the cube. The increased susceptibility to structural instabilities by the low weight design (e.g. plate structure) in connection with the offset balls is compensated by the use of corner connectors for the cube-edges to mount the balls on. The measurements on the ball cube yield—after evaluation—the linear approximations of the parametric errors of Cartesian axes machines: three errors of position, three errors of squareness, three roll errors, three yaw errors, and three pitch errors. The cube is as well a suited object to measure the errors of rotary tables of coordinate measuring machines and machine tools in situ. The calibration of the cube is performed by a length comparison between a calibrated reference ball bar and the ball distances along the 12 edges and the 12 diagonals of the 6 cube sides. This comparison is carried out with a self centring device.

7 Claims, 16 Drawing Sheets

BALL CUBE

SUMMARY

It is the objective of this invention to improve the design of ball cubes in such a way that the cubes can be manufactured at low cost and that the cubes can serve to experimentally determine the linear approximations of the errors of geometry (the so-called parametric errors) of coordinate measuring machines and machine tools, measuring the cube in only one position in the measuring volume. These linear contents of the parametric errors are the sources of most stability problems of machines.

The solution underlying this invention is a ball cube with balls that can be probed each with a multitude of differently directed long probe styli and which allows the probing points to be distributed over more than a hemisphere in each case. This is required if the parametric errors shall be accurately separated from each other, from the elastic effects of the ball cube, and from probing errors. Therefore the balls are given a distance from the cube's corners by fixing them on fasteners. As the cube body must be of low weight and low cost, corner connectors, e.g. in form of small rigid cubes, are suggested to connect the balls and the cube body firmly. Thereby they prevent instabilities of the structure, particularly instabilities in form of rotations which would lead to translations of the off-standing balls. However, this approach allows to make the cube body from low weight elements, such as sheets or rods, and still give the balls an offset from the corners of the cube body.

The measurements on the ball cube yield—after evaluation—the linear approximations of the parametric errors of Cartesian axes machines: three errors of position, three errors of squareness, three roll errors, three yaw errors, and three pitch errors. The cube is as well a suited object to measure the errors of rotary tables (angular position, camming, axial slip, and run out) of coordinate measuring machines and machine tools in situ.

The calibration of the cube is performed by a length comparison between a calibrated reference ball bar and the ball distances along the edges and the diagonals of the cube. This comparison is carried out with a self centring device. This method is ideally applicable for the described cube design with balls being at a slight distance from the cube body (e.g. one ball radius).

BACKGROUND OF THE INVENTION

Figure 1A:
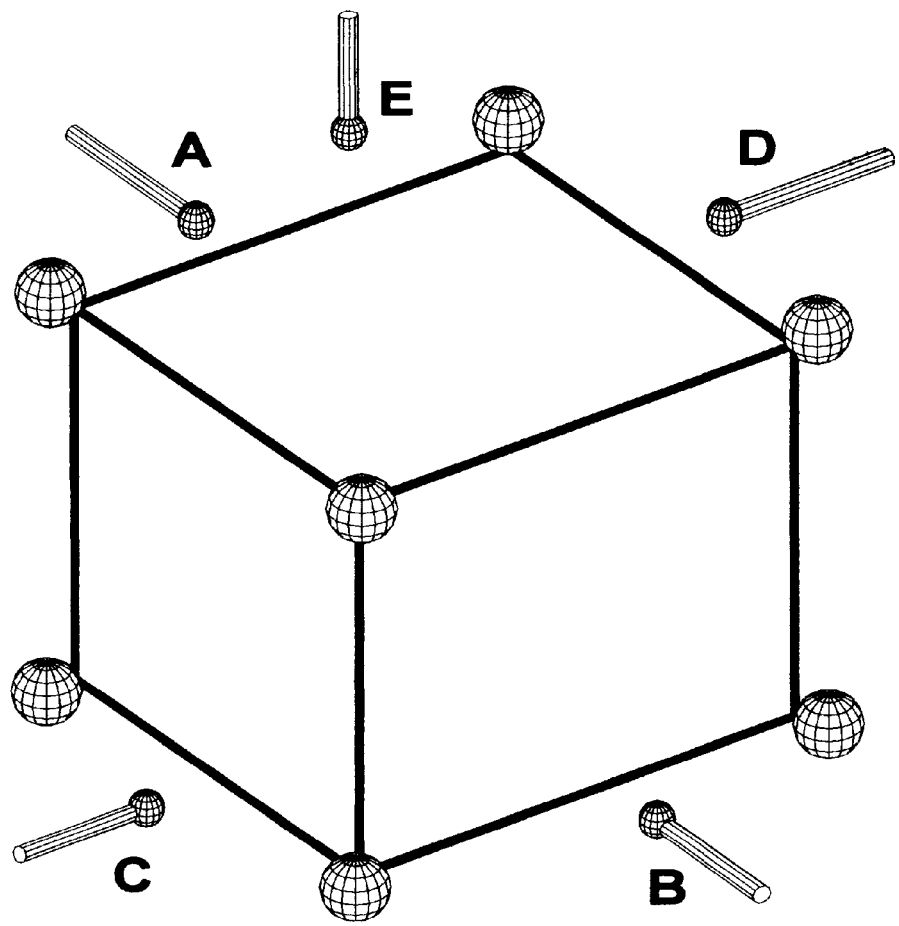
FIG. 1a Ball cube: requiring 1 object position, 18 ball measurements
Figure 1B:
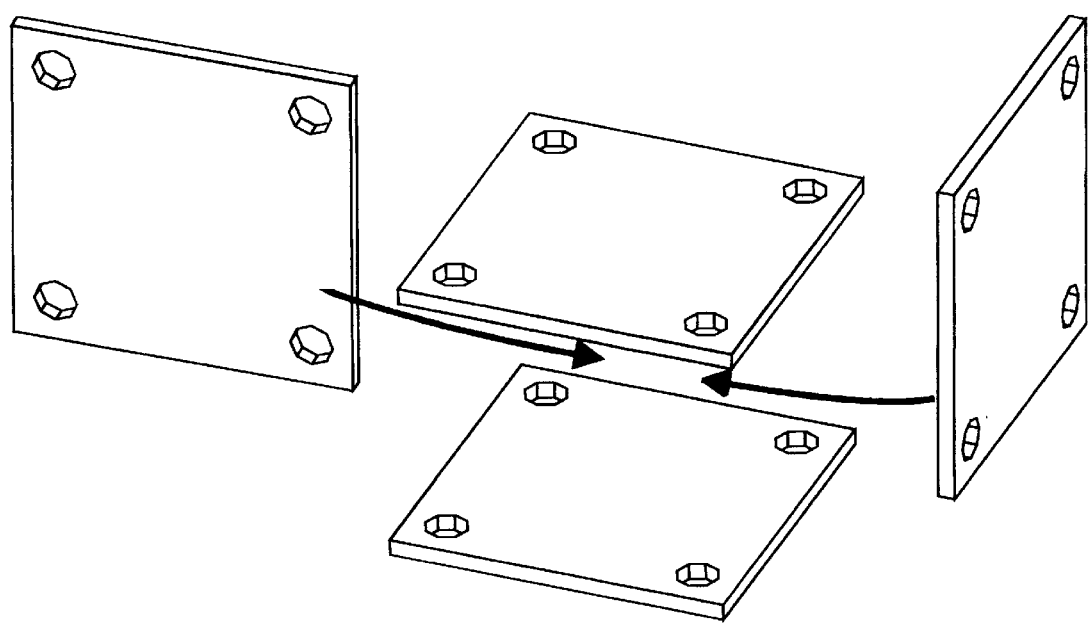
FIG. 1b Ball plate: (hole plate): requiring 4 different object positions, 19 ball (hole) measurements FIG. 1c Ball beam: requiring 10 different object positions, 32 ball measurements, 2 different lengths of ball beams are favourable FIG. 1d Styli: same styli suited for measurements on cube, plate, and beam
Figure 1C:
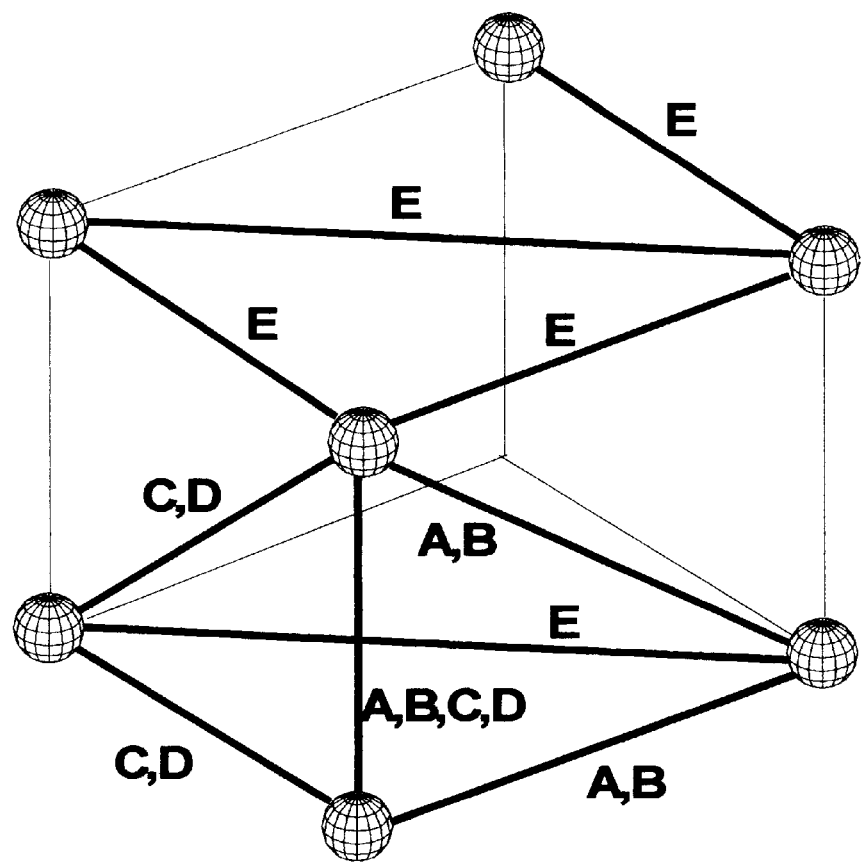
Figure 1D:
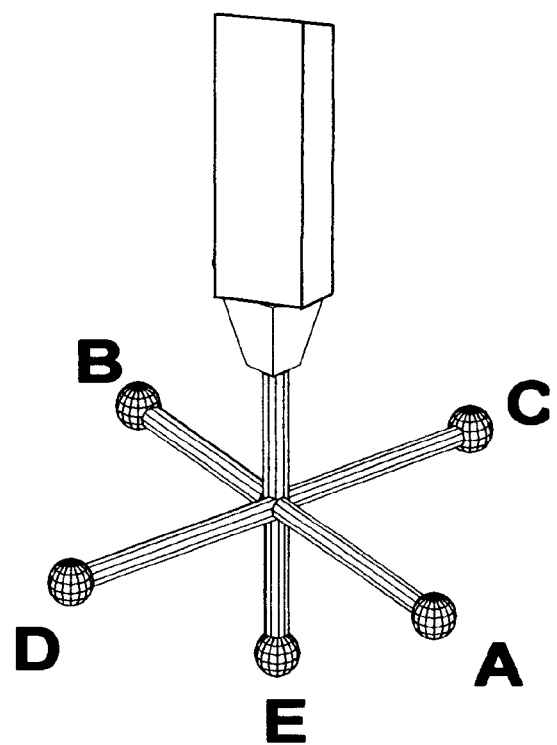

A reduction of the effort for calibration and interim checking of coordinate measuring machines and machine tools can be reached by a two level approach:

1) full-scale and more time-consuming methods (which allow to analyse all essential parameters governing the machine behaviour with a high datum point density), to be applied in larger time intervals; such methods require measurement times in the order of 3 to 8 hours 2) abbreviated, in their information content more restricted methods (which basically detect changes of the essential parameters governing the machine behaviour) to be applied in short time intervals between the full scale methods; such methods should require measurement times of less than half an hour.

This invention relates to an abbreviated economic method, which delivers only those parameters which are likely to undergo changes with time and due to environmental influences. Those are the linear contents of the parametric errors (see VDI/VDE 2617): "errors of position, roll, yaw, and pitch" as well as the "errors of squareness". Such linearly axis-position-dependent effects and constant effects (in case of squareness) can be measured by simple and cheap reference artefacts with only two datum points along each axis of motion: Gauge blocks, ball bars [2], ball plates with 2×2 balls, or an L-shaped plate of 3 balls [4], and cubes with 2×2×2 balls are in principle suited for the measurement of changes in the geometry error pattern of Cartesian axes machines [1].

As shown in FIG. 1, the minimum of effort to measure these errors is reached when using ball cubes: just one cube position is required in contrast to four positions of a four-ball-plate or four-hole-plate, and five positions with a three-ball-plate or three-hole-plate [4] and 10 ball bar [5] positions. In some positions measurements with multiple styli are required. Each of these procedures employing different artefacts yields the same amount of information but with different efforts. With the ball cube, which is the most economic artefact, the problem so far was that no ball cube designs, and correspondingly no algorithms, existed which allowed for an exact separation of all the machine's parametric errors from measurements of the cube in one position; in [3] it has been suggested as an approximation to use a set of so-called "cuboid error parameters" related to the errors of the measurement results related to the object, rather than breaking these errors down into the parametric errors of the machine under test (because this was not possible yet with the existing cuboid designs); quotation from [3] page 359: "the cuboid-error-parameters are of an abstract nature"

the probing of the balls was a problem with ball cubes made of rods, as the rods conceited most of the balls, as explicitly stated in [2]; quote from [2] page 89, left, 7th line from bottom ". . . rod structure . . . however this makes the access to the balls {for probing} more difficult as little of the ball surface is left accessible";

this was because the stiffness problems in the cube corners misled designers to join the rods directly centred to the balls with the intention that bending of the rods causing rotations of the corners should not shift the balls; the inventor's attempts to realise a cube according to [5] failed due to missing ball surface to distribute probing points in a symmetric way in order to cancel out systematic probing errors no design existed which allowed a calibration of the ball cube without the need for a coordinate measuring machine with an even higher accuracy than that of the machine to be inspected with the calibrated ball cube; this would exempt high accuracy machines from being checked with ball cubes; in [3] the problem with calibration is explicitly stated; quote from [3], page 354, right, center, beginning of paragraph: "A high accuracy calibration is today only possible for plane hole plates".

DETAILED DESCRIPTION OF THE INVENTION

Ball Cube Design

Figure 2A:
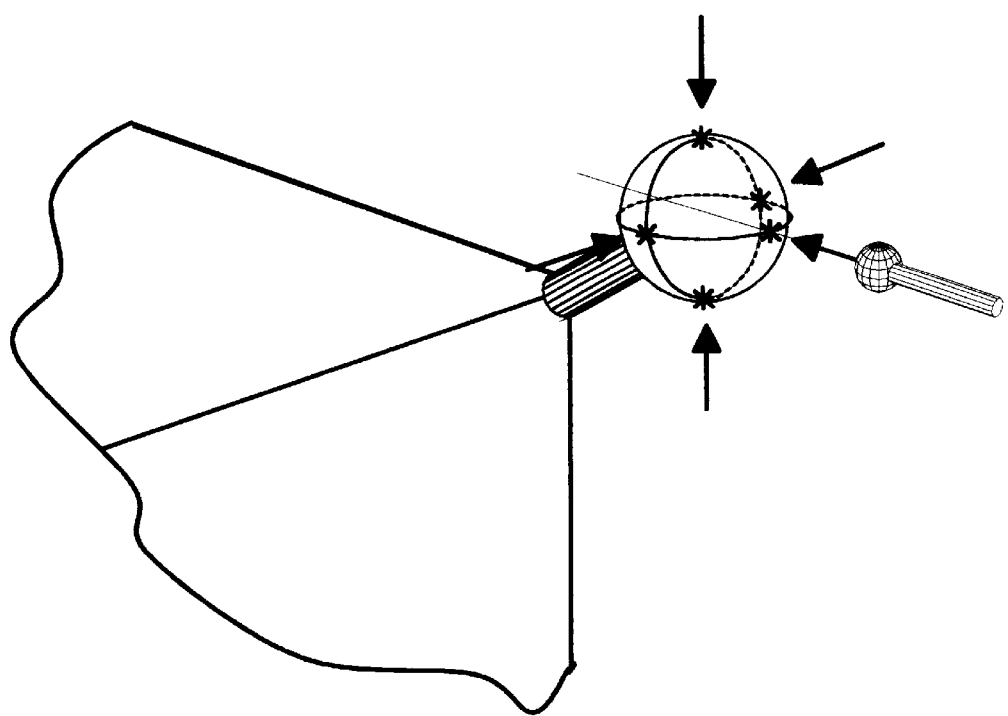
FIG. 2a–2c: Probing strategy for the four upper balls of the cube (those located in ram direction) using three different probe styli orthogonal to each other and normal to the cube's sides; the lower balls of the cube are only probed with two styli each
Figure 2B:
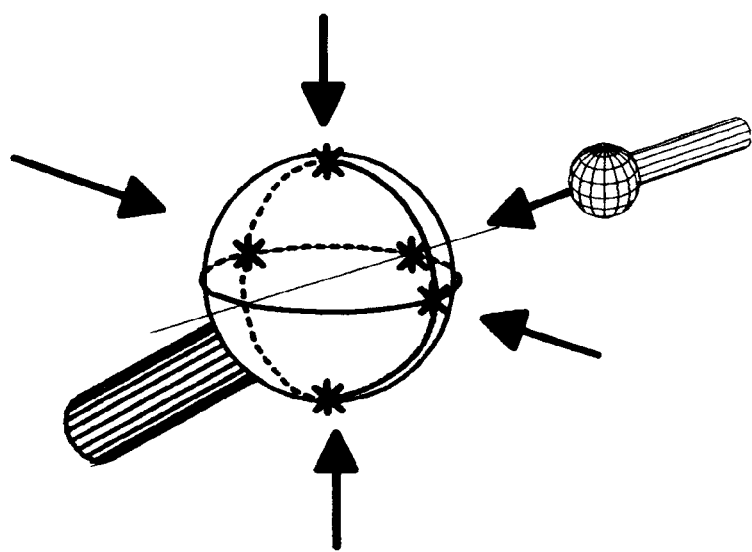
Figure 2C:
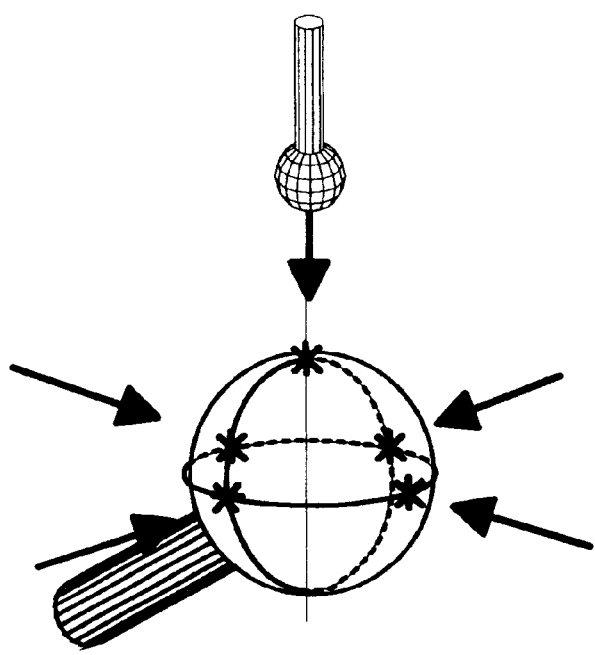

The invention relates to a cuboid structure with balls at its corners (in the following called "ball cube" if the entire object is referred to, and called "cube" or "cube body" if the cuboid structure is referred to) for the interim checking of coordinate measuring machines (CMMs) and machine tools. The balls are firmly fixed to fasteners in form of shafts, oriented in the directions of the cube's diagonals and the shafts are firmly fixed themselves to the corners of the cube. The shafts give the balls a distance from the structure of the cube so that the balls can be each probed with at least three different probe styli, which are orthogonal to each other and normal to the cube's sides. The probing point pattern as it is measured with each stylus covers at least a hemisphere of the cube's balls. This symmetric probing point distribution serves to cancel out elastic effects and systematic probing errors (directional error characteristic) which both would disturb the separation of the parametric errors of the machine's axes of motion (as they are e.g. defined in VDI/VDE 2617 part 3). FIG. 2a to FIG. 2c shows the minimum probing point pattern fulfilling these symmetry requirements as it is used for the four balls which are directed towards the ram of the machine. The other balls are measured with only two styli each.

Figure 3A:
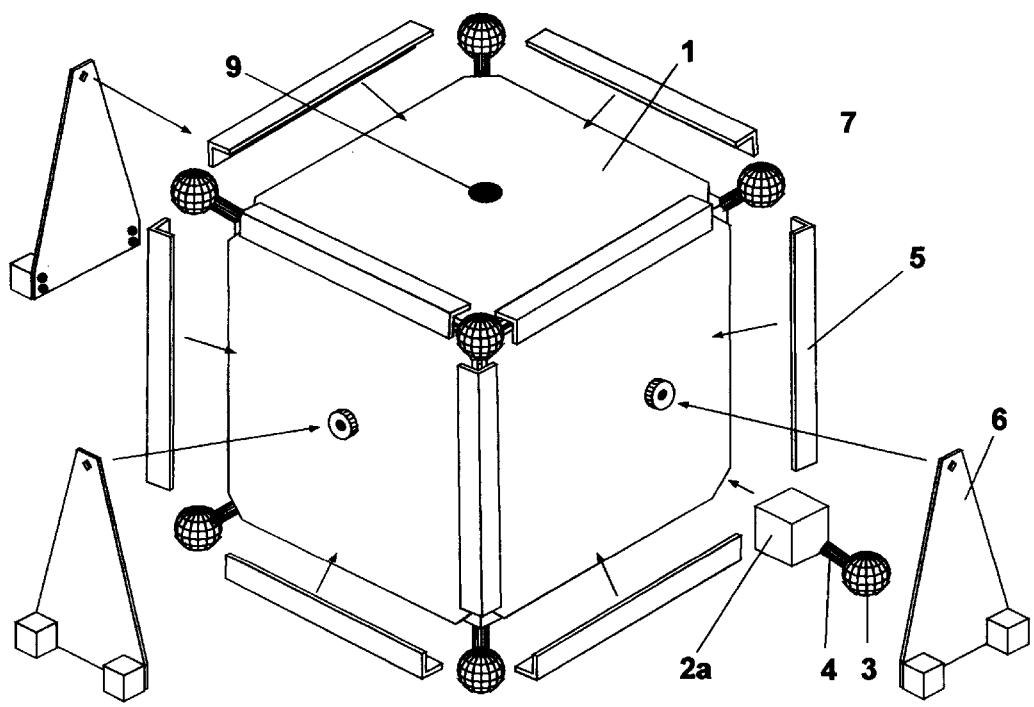
FIG. 3a–3c: Ball cube from plates, the corners are stiffened by a solid cube that supports as well the balls on their shafts (fasteners), this cube may as well be fixed to the plates by leaf springs
Figure 3B:
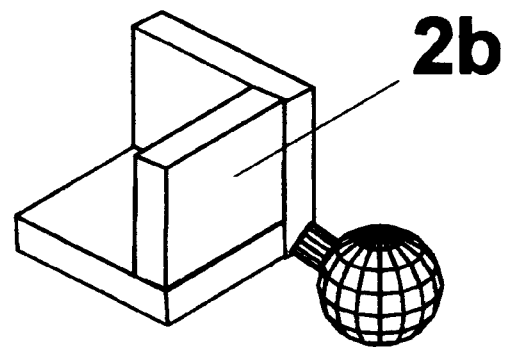
Figure 3C:
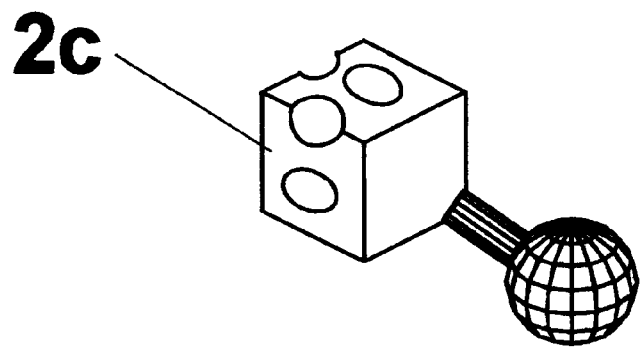

FIG. 3a shows an example for the realisation of such a ball cube. The cube body is made of six plates (detail 1 in FIG. 3) firmly attached to eight corner-connector elements in form of small cubes (detail 2a). Said corner-connectors are required to create translatorically and rotatorically stable elements between the plates as supports for the balls. Fasteners in form of shafts (detail 4) that hold the balls (detail 3) in cube-diagonal direction at the required distance from the cube corners and the cube body, are fixed to the connector-cubes. This design of the corners yields an optimally stiff connection between balls and cube structure as any translation and rotation of the connector cubes has to overcome an in-plane deformation of the plates (plates are more elastic for an out-of-plane bending). Suited connector elements are as well caps (detail 2b).

A further improvement of the stiffness of the entire structure is achieved by connectors for the cube edges (detail 5). Only by the said stiffening measures, the stand-off of the balls from the cube's corners, as it is required according to this invention, becomes possible for cubes of reasonable weight (e.g. less than 20 kg for a cube of 400 mm×400 mm×400 mm). All connections are preferably made by gluing to avoid stress as it may be introduced by screwing. Such stresses would reduce the long-term dimensional stability of the cube.

Figure 4:
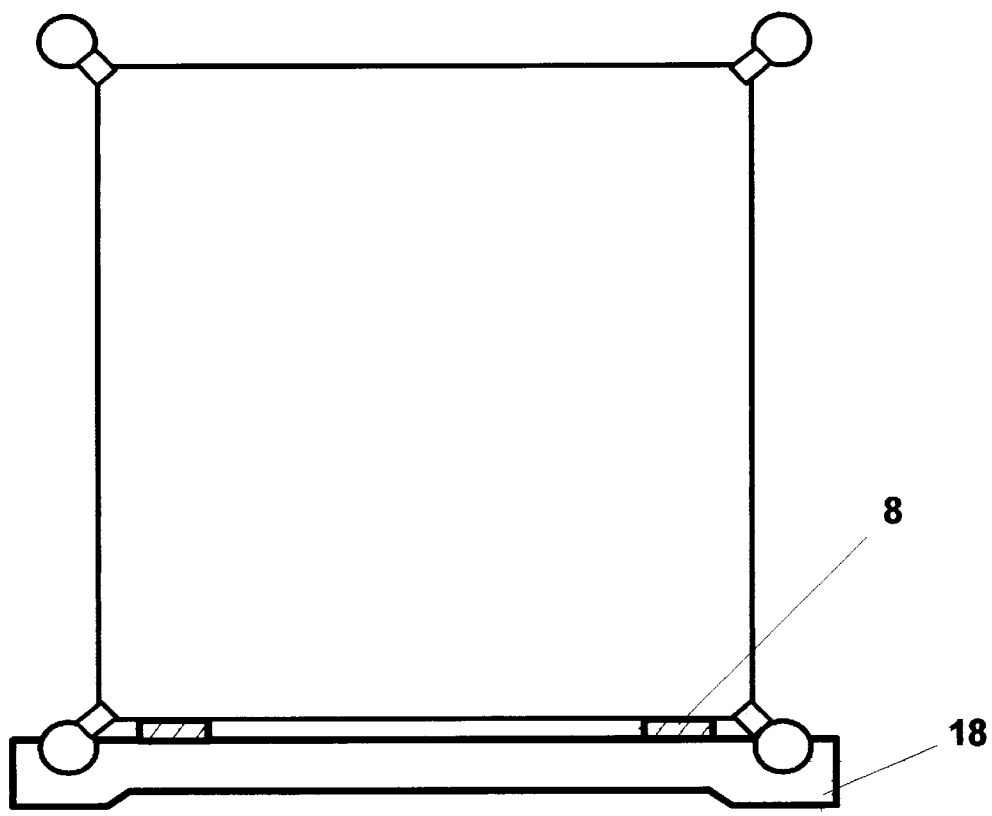
FIG. 4: Elastic bonding (detail 8) of the cube to the fixtures (detail 18)

The cube may ideally rest statically determined on leaf-springs (detail 6 in FIG. 3a), fixed to the cube's sides in one point (e.g. by one bolt) each. The leaf-springs are then clamped to the machine table. According to the invention, the cube may as well be elastically bonded to a fixturing system, e.g. in form of a base-plate (detail 18 in FIG. 4), e.g. by silicone glue. The said elastic bonding (detail 8 in FIG. 4) serves to isolate the cube body from stresses due to clamping and from thermally induced stresses. Thus the base-plate or the fixtures may be clamped, making mounting on the machine stable and easy to perform. According to the invention all balls can be probed in a symmetric way, consequently there are no effects from a deflection of fixtures under the probing forces.

A cube constructed from rod elements (e.g. made of carbon fiber composite with uni-directionally oriented fibers) is another light weight design of ball cubes. In this case connector elements with holes are used to fix the rods together (detail 2c in FIG. 3c).

In case the cube is made of material with a non-zero thermal expansion coefficient, a temperature correction must be applied. According to the invention, this can be done for cubes in form of a hollow closed structure, by placing a temperature sensor in the center of the cube, e.g. through a hole in a plate (detail 9 in FIG. 3a); this sensor will due to the heat radiation assume the mean temperature of the cube. As the cavity of the cube acts as a black body and thus has an effective emissivity of 1, the thermal equilibrium is quickly reached.

A major advantage of the here-described light-weight ball cube designs (as plate or rod structures with stiffening edge connectors), is that material of near zero thermal expansion can be used as it is available at reasonable cost only in form of panes and rods (e.g. ROBAX-glass from Schott or carbon fibre composites with longitudinally oriented fibers). A solid cube structure of such materials is not possible for reasons of cost. The advantages of such materials are a fast, easy, and accurate calibration and application of the cube: No waiting for thermal equilibrium is required and errors of temperature measurement are not existing.

Figure 8:
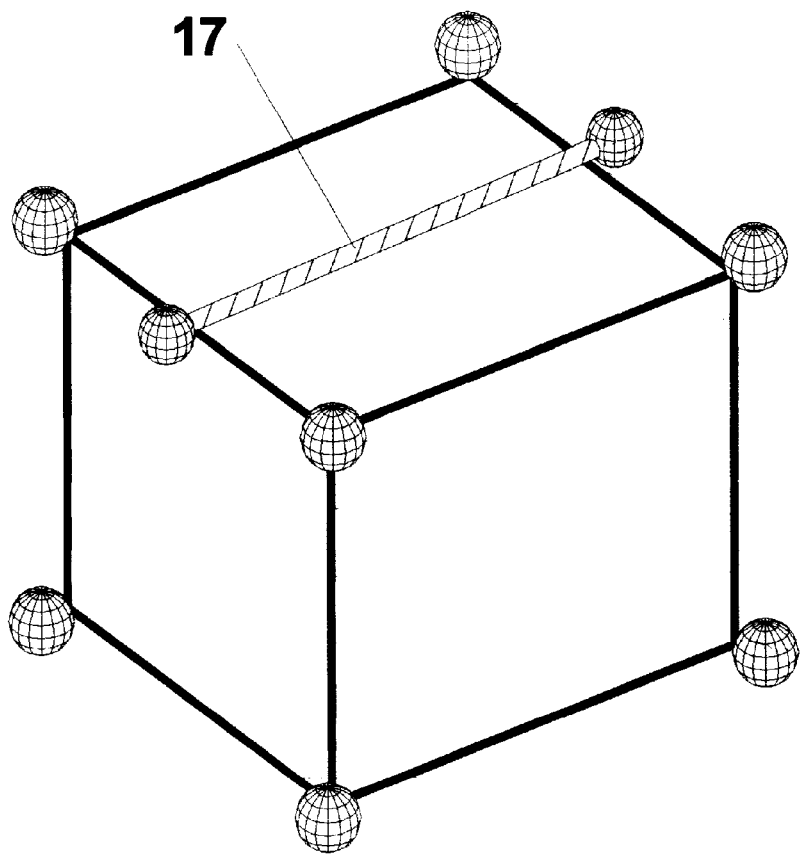
FIG. 8: Reference ball beam to calibrate the distances between ball centers on the ball cube

If the cube is made of thermally invariant material, according to this invention, an additional length standard of material with normal thermal expansion coefficient, e.g. a ball beam with known (calibrated) length (detail 17 in FIG. 8) or equivalently a hole beam or gauge block, may be used for the machine check. This allows on the one side to measure the parametric errors of the machine without disturbances from the cube's reaction on thermal changes, and it allows on the other side the inspection of the correction-hard and software supplied with the machine for the work-piece temperature.

Using the Ball Cube on a CMM and Evaluation

Figure 5:
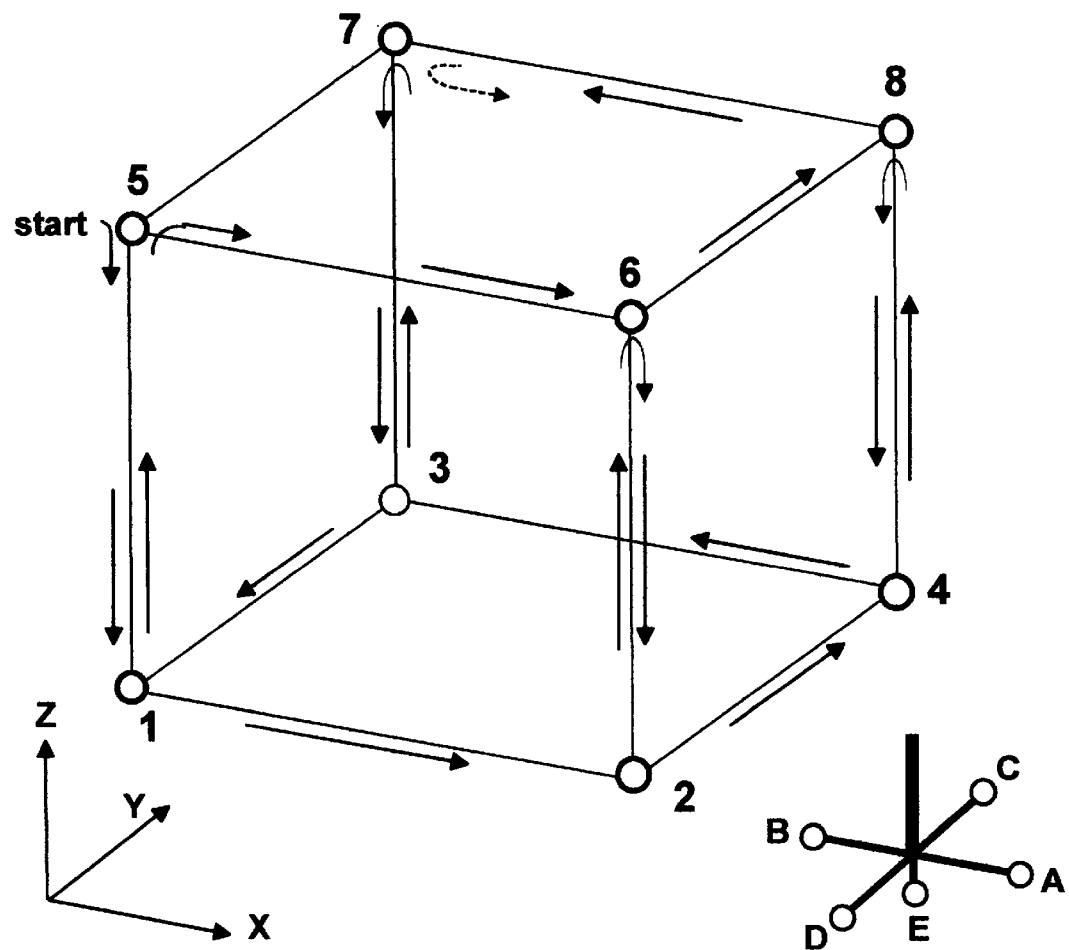
FIG. 5: Ball measurement sequence

FIG. 5 shows a recommended measurement sequence for the balls: Starting with stylus C, balls 5, 1, 2, and 6 are measured, then with stylus B, balls 6, 2, 4, and 8 are measured, then with stylus D, balls 8, 4, 3, and 7 are measured, then with stylus A, balls 7, 3, 1, and 5 are measured, finally with stylus E, the balls 5, 6, 8, and 7 are measured. The subsequent repeated measurement of all balls with a reversed sequence allows for the elimination (and determination) of translatorical and rotatorical drifts of the cube in the CMM's volume (drifts linear in time). FIG. 2a, 2b, and 2c show the symmetric distribution of probing points so that elastic bending of cube fixturing and the ball fasteners under the probing force is eliminated (in the coordinates of the ball centers). This optimum probing strategy is possible because of the diagonal fixing of the balls with an offset to this cube body.

At the end of this description, a set of formulas is given that allows the separation of the linear contents of the parametric errors of a machine which obeys the rigid body model. In case of horizontal arm machines which do not fully obey this model, a further parametric error is calculated: the column tilt as a function of ram extension. It is a single scalar value and it is calculated as the mean error of distance per unit of length, measured between the top balls of the cube in ram-direction, minus the mean error of distance per unit of length, measured between the bottom balls of the cube in ram direction, the result divided by the height of the cube (in column-direction).

Besides for the measurement of the parametric errors of linear axes, the ball cube is a suited object for the measurement of the parametric errors of rotary tables of coordinate measuring machines and machine tools, e.g. following the method described in [6].

Calibration of the Ball Cube

For the calibration of three-dimensional objects like ball cubes on CMMs, reversal techniques to eliminate the errors of the measuring machine are not applicable (as it is possible with one-dimensional and two-dimensional objects, e.g. ball plates). This is because "Screw-type" distortions of the measuring volume of a CMM (due to roll of the axes of motion) do not invert their direction with respect to the object's coordinate system when turning the object 180° around. Accurate methods known are only:

the calibration in comparison with an identical cube on a CMM (substitution method) and the calibration by direct length measurement (distances between ball centers).

The first method requires the existence of a more accurately calibrated master cube which finally depends on the existence of a master CMM of highest accuracy. This means that high accuracy-class CMMs cannot be checked by cubes as the cubes cannot be calibrated accurately enough (a standing rule is that the reference should be calibrated a factor of three to five more accurately than the device to be checked).

This invention relates to the second method in form of an economic, safe, and accurate procedure: the length measurement of the ball distances is made with a self-centring device which compares the ball distances with corresponding ball distances on a reference ball beam which itself has been calibrated to a laser interferometer or an equivalent device.

Figure 6A:
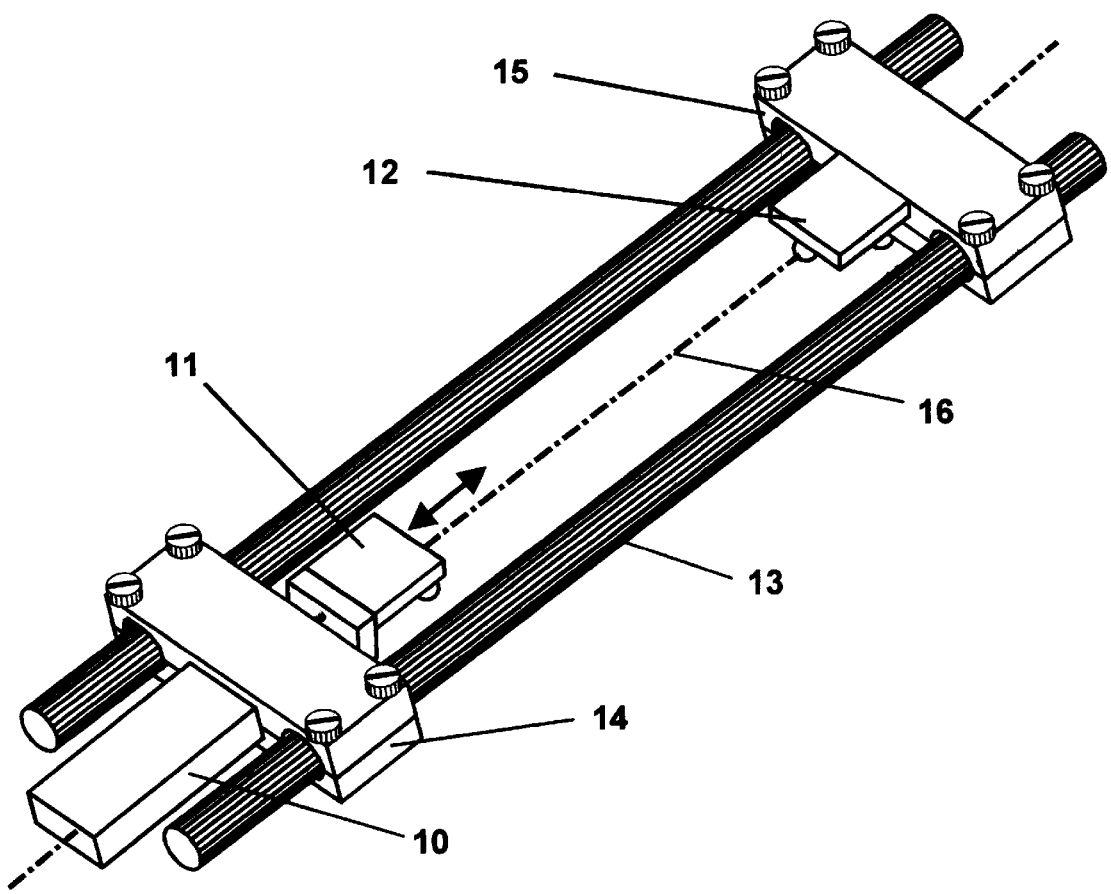
FIG. 6a and 6b: Self-centring device to calibrate the distances between ball centers in comparison with calibrated ball distances on a reference ball beam
Figure 6B:
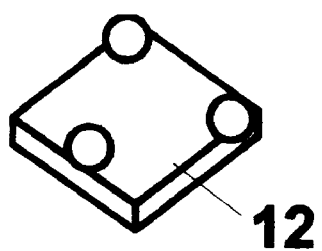
Figure 7:
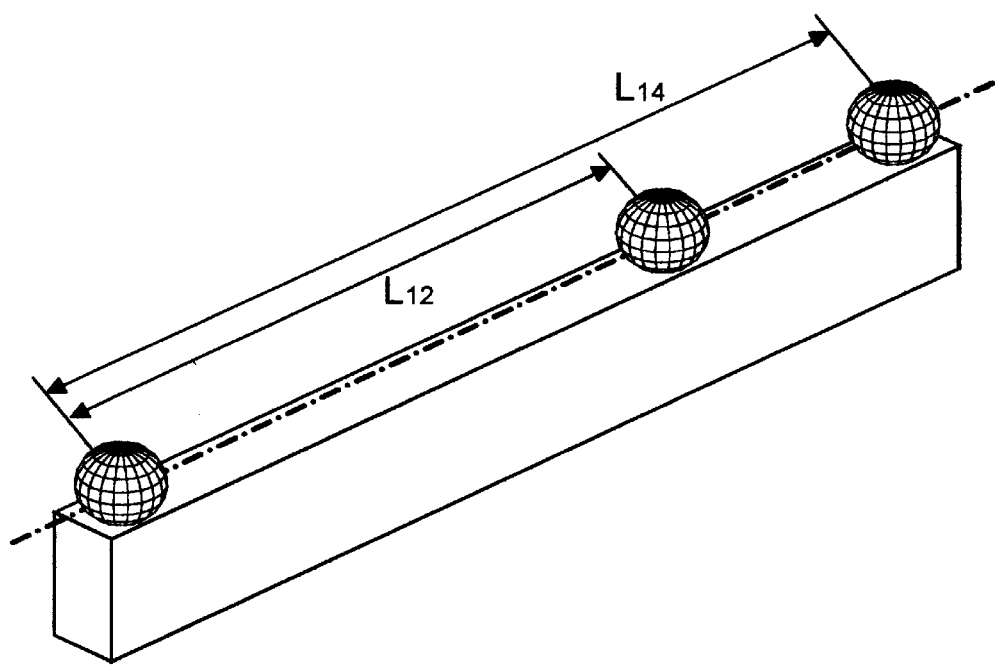
FIG. 7: Reference ball beam to calibrate the distances between ball centers on the ball cube

This method has the potential to be more accurate than any CMM. FIG. 6a and 6b show the self-centring device and FIG. 7 the reference ball beam. The self-centring device consists of an incremental probe (detail 10 in FIG. 6a) on which a self-centring element (detail 11) is fixed so that its movement along the center line (detail 16) of the self-centering device is measured. The probe shaft with the self-centering element (11) is freely movable in the direction of the symmetry line (detail 16) of the device. The probe (detail 10) is fixed to one side of a reference ball beam assembly (detail 13) at the opposite end of which a second self-centering element (detail 12) without a probe is fixed. The reference ball beam consists preferably of carbon fibre composite with longitudinally oriented fibres and with near zero thermal expansion. The probe with the self-centering device and the fixed self-centering device are attached to slides (details 14 and 15) which can be adjusted to fit the ball distance to be calibrated.

In order to minimise the influence of beam-bending on the measurement results, the effective line of measurement (probe shaft center) must pass through the symmetry line of the beam assembly (detail 16). During measurement, the ball centers must lie on this line too. This is possible due to the specific ball cube design with diagonally free-standing balls that allow all the ball distances (except for the cube's space-diagonals) to be measured in this ideal way.

A measurement sequence starts with zeroing the probe reading after placing the self-centring device on the reference ball beam (FIG. 7) and letting it center itself on both sides. Then the device is placed on two balls of the ball cube whose distance is to be measured. The reading gives the difference between the unknown ball distance on the ball cube and the known ball distance on the reference ball beam. The same procedure is repeated for all ball distances on the ball cube. Diagonals and edges of the ball cube need different length settings (e.g. achieved by shifting the slides 14 and 15) and different reference lengths on the reference ball beam.

All measured lengths are corrected for elastic bending of the ball seats under the weight of the self-centring device. Different corrections yield for edge distances and diagonal distances. These corrections are experimentally determined by adding defined weight to the self-centring device while it rests centred on the respective balls and by observing the reading of the probe. Finally the ball center coordinates are calculated from the measured ball distances using for example a Gaussian best fit (least squares sum).

FORMULAS

The following formulas serve to calculate the 15 parametric errors from the measured ball center cordinates. Input data to the formulas are the 5 times 4 error vectors (measured ball center coordinates as they result from the measurements with the different styli minus calibrated ball center coordinates).

$$
\begin{aligned}
xrx = \; & (((-'C6y' + 'C2y') - (-'C5y' + 'C1y'))/(Cube\_z * Cube\_x) + \\
& ((-D8y + D4y) - (-D7y + D3y))/(Cube\_z * Cube\_x) + \\
& (((E8z - E6z) - (E7z - E5z)) + ((D8z - 'C6z') - D7z - 'C5z')))/(2 * Cube\_y * Cube\_x) + \\
& ((D4z - 'C2z') - (D3z - 'C1z'))/(Cube\_y * Cube\_x) \quad )/4 \\
xry = \; & (((('C6x' - 'C5x' + E6x - E5x)/2 - ('C2x' - 'C1x')) + \\
& ((D8x - D7x + E8x - E7x)/2 - (D4x - D3x)))/(Cube\_x * Cube\_z) + \\
& ((B6x - A5x) - (B2x - A1x) + (B8x - A7x) - (B4x - A3x))/((Cube\_x + PrbX + ABS(Prb\_X)) * Cube\_z))/4 \\
xrz = \; & ( \\
& (((('C2x' + 'C6x') - ('C5x' + 'C1x')) - ((D4x + D8x) - (D7x + D3x))) + 
\end{aligned}
$$

-continued

```
            ((E6x - E5x) - (E8x - E7x)))/(Cube_x*Cube_y) +
            (((B2x + B6x) - (A5x + A1x)) -
            ((B4x + B8x) - A7x + A3x)))/(Cube_y*(Cube_x + PrbX + ABS(Prb_X)))
            )/5
    yrx =   (
            (((B4y - B2y) - (B8y - B6y)) + ((A3y - A1y) - (A7y - A5y)))/(2*Cube_y*Cube_z) +
            (((D4y - 'C2y') - (D8y - 'C6y')) + ((D3y - 'C1y') - (D7y - 'C5y')))/
            (2*(Cube_y + PrbY + ABS(Prb_Y))*Cube_z))/2
    yry =   ( ((((B8x - B4x) - (B6x - B2x)) + ((A7x - A3x) - (A5x - A1x)))/(2*Cube_z*Cube_y) +
            ((((B8z + B4z) - (B6z + B2z)) - ((A7z + A3z) - (A5z + A1z)))/2 - xrx*Cube_y*(Cube_x + PrbX +
            ABS(Prb_X)))/(Cube_y*(PrbX + ABS(Prb_X))) )/2
    yrz =   (
            ((A7y - A5y) + ((E8y - E6y) - (E7y - E5y))) +
            ((A3y - A1y) + ((D4y + 'C2y') - (D3y - 'C1y'))) -
            ((B4y + B8y) - (B2y + B6y)))/
            (2*Cube_y*(PrbX + ABS(Prb_X)))
    zrx =   (
            ((('C6z' - 'C2z') + (B8z - B4z) - (B6z - B2z)) + (('C5z' - 'C1z') + (A7z - A3z) - (A5z - A1z))) -
            (D8z - D4z + D7z - D3z))/
            (2*(PrbY + ABS(Prb_Y))*Cube_z)
    zry =   (
            ((B6z - B2z) + (('C5z' - 'C1z') - ('C6z '- 'C2z'))) + ((B8z - B4z) + ((D7z - D3z) - (D8z - D4z))) -
            (A5z + A7z - A1z - A3z))/
            (2*(PrbX + ABS(Prb_X))*Cube_z)
    zrz =   ((((B2y + B4y) - (B6y + B8y))/Cube_z) + (((A5y + A7y) -
            (A1y + A3y))/Cube_z))/(2*(PrbX + AB5(Prb_X))) -
            xrx*(PrbX + ABS(Prb_X) + Cube_x)/(PrbX + ABS(Prb_X))
    ywx =   (
            (E6x + E5x - E7x - E8x)/(2*Cube_y) + E5y + E7y - E8y - E6y)/(2*Cube_x) +
            (yry*Cube_z - xrx*Cube_z)/2 +
            ((A5x + A1x + B2x + B6x) - (A3x + A7x + B4x + B8x))/(2*Cube_y) +
            (('C1y' + 'C5y' + D3y + D7y) - ('C2y' + 'C6y' + D4y + D8y))/(2*Cube_x) - xrz*(ABS(Prb_X) - PrbX))/3
    zwx =   (
            (('C5x' + 'C6x') - ('C1x' + 'C2x'))/(2*Cube_z) + (('C2z' + 'C6z') - ('C1z' + 'C5z'))/(2*Cube_x) +
            yry * (PrbY + Cube_y/2) +
            ((D7x + D8x) - (D3x + D4x))/(2*Cube_z) + ((D4z + D8z) - (D3z + D7z))/(2*Cube_x) -
            zrz*(ABS(Prb_Y) - PrbY) - yry*(ABS(Prb_Y) + Cube_y/2) +
            ((A5x + B6x) - (A1x + B2x))/(2*Cube_z) + (E6z - E5z)/Cube_x +
            ((A7x + B8x) - (A3x + B4x))/(2*Cube_z) + (E8z - E7z)/Cube_x - xry*(ABS(Prb_X) - PrbX))/4
    zwy =   (
            ((B2y + B4y) - (B6y + B8y))/(2*Cube_z) + ((B2z + B6z) - (B4z + B8z))/(2*Cube_y) -
            (zrz*(ABS(Prb_X) - PrbX)) - (yry*(ABS(Prb_X) - PrbX)) +
            ((A1y + A3y) - (A5y + A7y))/(2*Cube_z) + ((A1z + A5z) - (A3z + A7z))/(2*Cube_y) +
            (('C2y' + D4y) - ('C6y' + D8y))/(2*Cube_z) + (E6z - E8z)/Cube_y + (('C1y + D3y) -
            ('C5y' + D7y))/(2*Cube_z) + (E5z - E7z)/Cube_y - yrx*(AB5(Prb_Y) - PrbY))/4
    xpx =   (
            ((C6x + C2x) - (C5x + C1x))/2 - (xrz)*Cube_x*Cube_y/2 +
            ((D4x + D8x) - (D3x + D7x))/2 + (xrz)*Cube_x*Cube_y/2 +
            ((E6x - E5x) - xry*Cube_x*Cube_z/2 + (E8x - E7x) - xry*Cube_x*Cube_z/2)/2)/
            (3*Cube_x)
    ypy =   (
            ((B4y + B8y) - (B2y + B6y))/2 + (yrz)*Cube_y * ABS(Prb_X) +
            ((A3y + A7y) - (A1y + A5y))/2 - (yrz)*Cube_y * PrbX +
            ((E7y - E5y) + yrx*Cube_y*Cube_z/2 + (E8y - E6y) + yrx*Cube_y*Cube_z/2)/2)/
            (3*Cube_y)
    zpz =   (
            ((A5z + A7z) - (A1z + A3z))/2 + (zry)*Cube_z * PrbX +
            ((B6z + B8z) - (B2z + B4z))/2 - (zry)*Cube_z * ABS(Prb_X) +
            (('C5z' + 'C6z') - ('C1z' + 'C2z'))/2 - (zrx)*Cube_z * PrbY + ((D7z + D8z) - (D3z + D4z))/2)/
            (zrx)*Cube_z * ABS(Prb_Y))/
            (4*Cube_z)
```

VARIABLES

A1x ... E8z are the vector components (components x, y, z) of the errors of ball center coordinates as measured with the machine at the locations of the eight balls (ciphers 1–8) with the five prove styli (letters A–E). Signs follow the rule "measured value minus calibrated value".

| | |
|---|---|
| A1x | X-coordinate of ball 1 measured with stylus in +X-direction (cube side A) |
| A1y | Y-coordinate of ball 1 measured with stylus in +X-direction (cube side A) |
| A1z | Z-coordinate of ball 1 measured with stylus in +X-direction (cube side A) |
| A3x | X-coordinate of ball 3 measured with stylus in +X-direction (cube side A) |
| A3y | Y-coordinate of ball 3 measured with stylus in +X-direction (cube side A) |
| A3z | Z-coordinate of ball 3 measured with stylus in +X-direction (cube side A) |

-continued

| | |
|---|---|
| A5x | X-coordinate of ball 5 measured with stylus in +X-direction (cube side A) |
| A5y | Y-coordinate of ball 5 measured with stylus in +X-direction (cube side A) |
| A5z | Z-coordinate of ball 5 measured with stylus in +X-direction (cube side A) |
| A7x | X-coordinate of ball 7 measured with stylus in +X-direction (cube side A) |
| A7y | Y-coordinate of ball 7 measured with stylus in +X-direction (cube side A) |
| A7z | Z-coordinate of ball 7 measured with stylus in +X-direction (cube side A) |
| B2x | X-coordinate of ball 2 measured with stylus in −X-direction (cube side B) |
| B2y | Y-coordinate of ball 2 measured with stylus in −X-direction (cube side B) |
| B2z | Z-coordinate of ball 2 measured with stylus in −X-direction (cube side B) |
| B4x | X-coordinate of ball 4 measured with stylus in −X-direction (cube side B) |
| B4y | Y-coordinate of ball 4 measured with stylus in −X-direction (cube side B) |
| B4z | Z-coordinate of ball 4 measured with stylus in −X-direction (cube side B) |
| B6x | X-coordinate of ball 6 measured with stylus in −X-direction (cube side B) |
| B6y | Y-coordinate of ball 6 measured with stylus in −X-direction (cube side B) |
| B6z | Z-coordinate of ball 6 measured with stylus in −X-direction (cube side B) |
| B8x | X-coordinate of ball 8 measured with stylus in −X-direction (cube side B) |
| B8y | Y-coordinate of ball 8 measured with stylus in −X-direction (cube side B) |
| B8z | Z-coordinate of ball 8 measured with stylus in −X-direction (cube side B) |
| C1x | X-coordinate of ball 1 measured with stylus in +Y-direction (cube side C) |
| C1y | Y-coordinate of ball 1 measured with stylus in +Y-direction (cube side C) |
| C1z | Z-coordinate of ball 1 measured with stylus in +Y-direction (cube side C) |
| C2x | X-coordinate of ball 2 measured with stylus in +Y-direction (cube side C) |
| C2y | Y-coordinate of ball 2 measured with stylus in +Y-direction (cube side C) |
| C2z | Z-coordinate of ball 2 measured with stylus in +Y-direction (cube side C) |
| C5x | X-coordinate of ball 5 measured with stylus in +Y-direction (cube side C) |
| C5y | Y-coordinate of ball 5 measured with stylus in +Y-direction (cube side C) |
| C5z | Z-coordinate of ball 5 measured with stylus in +Y-direction (cube side C) |
| C6x | X-coordinate of ball 7 measured with stylus in +Y-direction (cube side C) |
| C6y | Y-coordinate of ball 7 measured with stylus in +Y-direction (cube side C) |
| C6z | Z-coordinate of ball 7 measured with stylus in +Y-direction (cube side C) |
| D3x | X-coordinate of ball 3 measured with stylus in −Y-direction (cube side D) |
| D3y | Y-coordinate of ball 3 measured with stylus in −Y-direction (cube side D) |
| D3z | Z-coordinate of ball 3 measured with stylus in −Y-direction (cube side D) |
| D4x | X-coordinate of ball 4 measured with stylus in −Y-direction (cube side D) |
| D4y | Y-coordinate of ball 4 measured with stylus in −Y-direction (cube side D) |
| D4z | Z-coordinate of ball 4 measured with stylus in −Y-direction (cube side D) |
| D7x | X-coordinate of ball 7 measured with stylus in −Y-direction (cube side D) |
| D7y | Y-coordinate of ball 7 measured with stylus in −Y-direction (cube side D) |
| D7z | Z-coordinate of ball 7 measured with stylus in −Y-direction (cube side D) |
| D8x | X-coordinate of ball 8 measured with stylus in −Y-direction (cube side D) |
| D8y | Y-coordinate of ball 8 measured with stylus in −Y-direction (cube side D) |
| D8z | Z-coordinate of ball 8 measured with stylus in −Y-direction (cube side D) |
| E5x | X-coordinate of ball 5 measured with stylus in −Z-direction (cube side E) |
| E5y | Y-coordinate of ball 5 measured with stylus in −Z-direction (cube side E) |
| E5z | Z-coordinate of ball 5 measured with stylus in −Z-direction (cube side E) |
| E6x | X-coordinate of ball 6 measured with stylus in −Z-direction (cube side E) |
| E6y | Y-coordinate of ball 6 measured with stylus in −Z-direction (cube side E) |
| E6z | Z-coordinate of ball 6 measured with stylus in −Z-direction (cube side E) |
| E7x | X-coordinate of ball 7 measured with stylus in −Z-direction (cube side E) |
| E7y | Y-coordinate of ball 7 measured with stylus in −Z-direction (cube side E) |
| E7z | Z-coordinate of ball 7 measured with stylus in −Z-direction (cube side E) |
| E8x | X-coordinate of ball 8 measured with stylus in −Z-direction (cube side E) |
| E8y | Y-coordinate of ball 8 measured with stylus in −Z-direction (cube side E) |
| E8z | Z-coordinate of ball 8 measured with stylus in −Z-direction (cube side E) |
| Cube_x | cube side-length in X-direction |
| Cube_y | cube side-length in Y-direction |
| Cube_z | cube side length in Z-direction |
| Prb_X | probe stylus with shaft in −X-direction |
| Prb_Y | probe stylus with shaft in −Y-direction |
| PrbX | probe stylus with shaft in +X-direction |
| PrbY | probe stylus with shaft in +Y-direction |
| Prb_Z | probe stylus with shaft in −Z-direction |
| xpx | parametric error "position in X" (linear approximation) |
| xrx | parametric error "roll in X" (linear approximation) |
| xry | parametric error "pitch in X" (linear approximation) |
| xrz | parametric error "yaw in X" (linear approximation) |
| ypy | parametric error "position in Y" (linear approximation) |
| yrx | parametric error "pitch in Y" (linear approximation) |
| yry | parametric error "roll in Y" (linear approximation) |
| yrz | parametric error "yaw in Y" (linear approximation) |
| ywx | squareness error between Y-axis and X-axis |
| zpz | parametric error "position in Z" (linear approximation) |
| zrx | parametric error "yaw in X" (linear approximation) |
| zry | parametric error "pitch in X" (linear approximation) |
| zrz | parametric error "roll in X" (linear approximation) |
| zwx | squareness error between Z-axis and X-axis |
| zwy | squareness error between Z-axis and Y-axis |

BALL CUBE

A patent application for this invention entitled "Kugelquader" was filed in Germany under the number 196 44 712.7-52 on Oct. 28, 1996.

Further Literature

[1] Trapet, E., Wäldele, F.: A Reference Object Based Method to Determine the Parametric Error Components of Coordinate Measuring Machines and Machine Tools, Measurement 9 (1991), pages 17–22

[2] Schüssler, H. H.: Prüfkörper für Koordinatenmeßgeräte, Werkzeugmaschinen und Meßroboter (Maser pieces for coordinate measuring machines, machine tools, and measuring robots), Technisches Messen, 51. Jahrgang, Heft 3, pages 83–95

[3] Schüissler, H. H.: Messtechnische Beurteilung von Prüfkörpem und Koordinatenmessgeräten anhand von Streckenmessungen, Rechteck- und Quader-Kennwerten (Precision test of master pieces and coordinate measuring machines using distance measurements, rectangle and cuboid characteristics), Technisches Messen tm, 52. Jahrgang, Heft 10/1985, pages 353–366

[4] U.S. Pat. No. 5,313,410: W. A. Watts: Artifact and method for verifying accuracy of positioning apparatus

[5] U.S. Pat. No. 5,269,067: Wäldele, Trapet: Test specimen composed of rod segments for co-ordinate measuring instruments

[6] U.S. Pat. No. 4,819,339: Kunzmann, Schepperle, Trieb, Wäldele: Method of measuring rotary table deviations Having described the ball cube reference object in detail, I claim:

1. A ball cube in the form of a cuboid structure, said cuboid structure having balls in its corners, said ball cube being a reference object for the determination of the parametric errors of the axes of motion of coordinate measuring machines and machine tools by measuring the coordinates of the ball centers with the machine to be checked, the errors calculated from these ball measurements being: roll, yaw, pitch, column tilt, errors of squareness, and errors of position, said ball cube being characterised in that:

at least in seven of the eight corners of said cuboid structure balls being firmly mounted, the balls being fixed to said cuboid structure by fasteners through the balls in cuboid-diagonal directions, thus leaving most of the balls' surfaces undisturbed for probing, the balls being fixed at such distances away from the cuboid's corners in cuboid-diagonal direction, that each ball can be probed with at least three different probe styli whose shafts are orthogonal to each other and normal to different sides of the ball cube, and that with each such probe stylus probing points can be collected which are distributed over a hemisphere of the respective ball, without colliding with the cuboid structure or with fasteners of the balls, the center coordinates of the balls of the ball cube being known by calibration with reference to a standard of length.

2. A ball cube according to claim 1, characterised in that the cuboid structure consists of plate segments, said plate segments being firmly connected to each other and to said balls by stiffener elements that combine the three degrees of freedom which are retained by each plate to a total of six retained degrees of freedom when the three plates are joined at a corner of the cuboid structure.

3. A ball cube according to claim 1, characterised in that said ball cube is made in form of a hollow and closed structure and that at least one temperature sensor is placed in the interior of this structure to measure the temperature of the ball cube for temperature correction purposes, the sensor naturally assuming the desired average ball cube temperature by an exchange of heat radiation.

4. A ball cube according to claim 1, characterised in that the cuboid structure consists of plate segments made of material with a low thermal expansion coefficient.

5. A ball cube according to claim 1, characterised in that said ball cube is connected to a fixturing system through elastic bonding, which prevents deformations of the ball cube by the clamping forces applied to the fixtures, and as well by thermally induced deformations in these fixtures.

6. A ball cube according to claim 1, characterised in that said ball cube is calibrated by measuring the distances between the ball centers by means of a self-centring comparator device to transfer the length from a calibrated reference ball beam to the ball cube, the calibration procedure being characterised in that:

the reference value is read when the comparator is placed self-centred on the calibrated reference ball beam, the reading of the comparator, when placed on top of the balls of the ball cube to be calibrated, is corrected for the bending of the ball fasteners in the cube's corners under the comparator's weight, the line of measurement of the self-centering comparator coincides with the symmetry line of the structure of said self-centering comparator and said line of measurement passes through the centers of the balls at the corners of the ball cube when the comparator is placed on top of the balls.

7. A ball cube according to claim 1, characterised in that said ball cube is made of material with a low thermal expansion coefficient to optimise the parametric error measurement, and that a simple length standard in form of a gauge block, ball beam, or hole beam is attached to the ball cube, said length standard possessing a thermal expansion coefficient of common magnitude in order to test the workpiece-temperature correction performance of the machine under inspection.

* * * * *